United States Patent
Siebenmorgen et al.

(10) Patent No.: US 11,231,572 B2
(45) Date of Patent: Jan. 25, 2022

(54) ARRANGEMENT, MICROSCOPE AND METHOD FOR TIRF MICROSCOPY

(71) Applicant: Carl Zeiss Microscopy GmbH, Jena (DE)

(72) Inventors: Jörg Siebenmorgen, Jena (DE); Ralf Netz, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 185 days.

(21) Appl. No.: 16/482,827

(22) PCT Filed: Feb. 15, 2018

(86) PCT No.: PCT/EP2018/053789
§ 371 (c)(1),
(2) Date: Aug. 1, 2019

(87) PCT Pub. No.: WO2018/166744
PCT Pub. Date: Sep. 20, 2018

(65) Prior Publication Data
US 2020/0012084 A1      Jan. 9, 2020

(30) Foreign Application Priority Data

Mar. 15, 2017 (DE) .......................... 102017204325.3

(51) Int. Cl.
*G02B 21/06* (2006.01)
*G02B 21/00* (2006.01)
(Continued)

(52) U.S. Cl.
CPC ......... *G02B 21/06* (2013.01); *G02B 21/0032* (2013.01); *G02B 21/367* (2013.01); *G02B 21/0076* (2013.01); *G02B 21/025* (2013.01)

(58) Field of Classification Search
None
See application file for complete search history.

(56) References Cited

U.S. PATENT DOCUMENTS

| | | |
|---|---|---|
| 5,796,487 A | 8/1998 | Guerra |
| 11,163,147 B2 | 11/2021 | Siebenmorgen et al. |
| 2019/0170995 A1* | 6/2019 | Siebenmorgen ..... G02B 21/361 |

FOREIGN PATENT DOCUMENTS

| | | |
|---|---|---|
| CN | 105190399 A | 12/2015 |
| CN | 106338840 A | 1/2017 |

(Continued)

OTHER PUBLICATIONS

McGorty. Ryan, et al.; "Open-top selective plane Illumination microscope for conventionally mounted specimens" Optics Express 2015; 23(12):16141-16153.

(Continued)

*Primary Examiner* — Darryl J Collins
*Assistant Examiner* — Tamara Y. Washington
(74) *Attorney, Agent, or Firm* — Duane Morris LLP (57) ABSTRACT

An arrangement for TIRF microscopy, having an illumination optical unit with an illumination objective for illuminating a specimen on a specimen carrier in a specimen plane via an illumination beam path. An optical axis of the illumination objective includes an illumination angle that differs from zero with the normal of the specimen plane. A detection optical unit with a detection objective in a detection beam path includes a detection angle that differs from zero between an optical axis thereof and the normal of the specimen plane. A transition element between the specimen carrier and both objectives is arranged both in the illumination beam path and in the detection beam path. The transition element corrects aberrations that arise on account of the passage through media with different refractive indices of radiation to be detected and/or radiation for illuminating the specimen.

9 Claims, 5 Drawing Sheets

(51) Int. Cl.
G02B 21/36 (2006.01)
G02B 21/02 (2006.01)

(56) References Cited

FOREIGN PATENT DOCUMENTS

| | | |
|---|---|---|
| DE | 102013112600 | 5/2015 |
| DE | 102015103802 A1 | 9/2016 |
| DE | 202016008115 U1 | 4/2017 |
| WO | 2015071363 A1 | 5/2015 |
| WO | 2016054474 A1 | 4/2016 |
| WO | 2016105934 A2 | 6/2016 |

OTHER PUBLICATIONS

Notification of Transmittal of the International Preliminary Report on Patentability, International Preliminary Report on Patentability and Translation of Written Opinion of the International Searching Authority.
Second Chinese Office Action for CN201 880014305.4 dated Oct. 20, 2021.

* cited by examiner

ARRANGEMENT, MICROSCOPE AND METHOD FOR TIRF MICROSCOPY

RELATED APPLICATIONS

The present application is a U.S. National Stage application of International PCT Application No. PCT/EP2018/053789 filed on Feb. 15, 2018, which claims priority benefit of German Application No. DE 10 2017 204 325.3 filed on Mar. 15, 2017, the contents of each are incorporated by reference in their entirety.

FIELD OF THE INVENTION

The invention relates to an arrangement for total-internal reflection microscopy (TIRF microscopy), in particular TIRF light sheet microscopy, according to the preamble of independent claim 1. Further, the invention relates to the use of the arrangement, a microscope and a method for TIRF microscopy.

BACKGROUND OF THE INVENTION

In total-internal reflection microscopy, also referred to as TIRF microscopy (total-Internal reflection fluorescence microscopy), evanescent fields are produced and used to observe structures and processes, for example, at the surface and the surface-near layers of a specimen. To this end, an evanescent illumination, also referred to as TIRF field, as evanescent wave or as evanescent field, is coupled into at least one region of the specimen. The fact that, despite total-internal reflection of illumination radiation (light) occurring at an interface, light penetrates further than the interface into the medium beyond the interface, for example into the specimen, and quickly decays there, is exploited for the purposes of producing an evanescent field. By way of example, the evanescent field of an optical waveguide or the evanescent field resulting from total-internal reflection at an optical interface, such as a cover slip, for example, can be used.

If the specimen contains molecules that are excitable to emit detection radiation, for example fluorescence, by the light (illumination radiation) of the evanescent field, then these molecules can be excited to emit the detection radiation in the region of the evanescent field. The detection radiation can be captured and evaluated by means of suitable detectors.

Figure 1A:
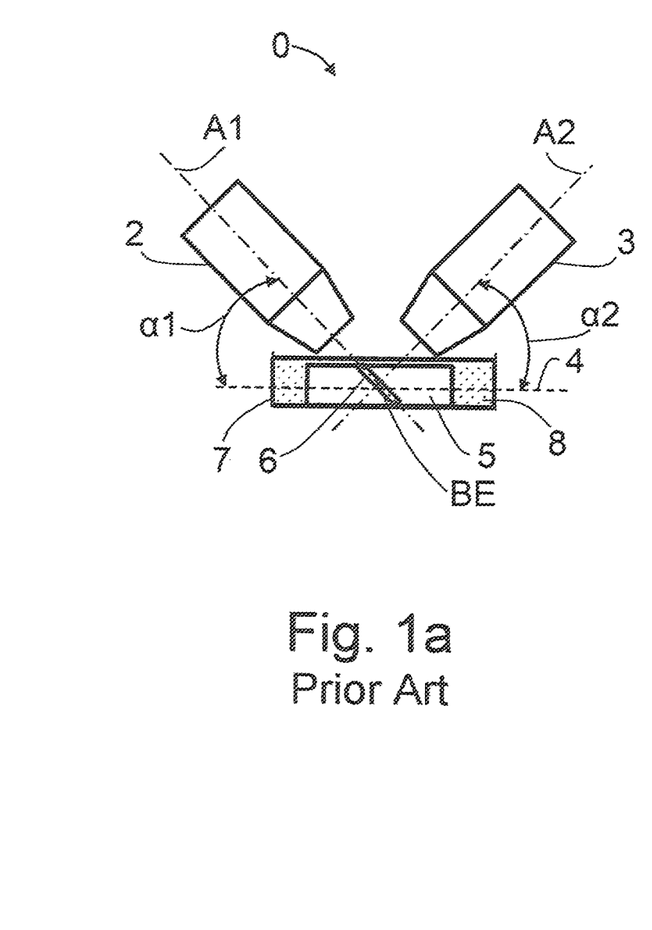
FIG. 1a is a schematic illustration of an arrangement of a light sheet microscope according to the prior art.
Figure 1B:
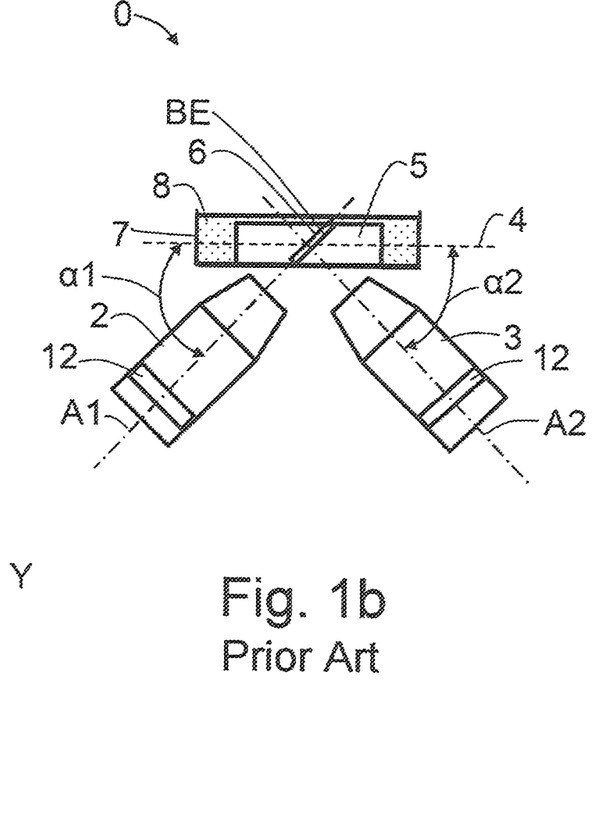
FIG. 1b is a schematic illustration of an inverted arrangement of a light sheet microscope according to the prior art.

In accordance with the prior art, a layout of a microscope 0 for light sheet microscopy (SPIM layout; single plane illumination microscopy; FIGS. 1a and 1b) has an illumination objective 2 with a first optical axis A1 and a detection objective 3 with a second optical axis A2 (also referred to as SPIM objectives below) which are each directed onto a specimen plane 4 from above at an angle α1 or α2 of 45' in relation to the specimen plane 4 and at right angles in relation to one another (see FIG. 1a). This approach offers the advantage of a high resolution in the axial direction since a thin light sheet 6 (see also FIG. 1b) may be, produced in an image plane BE by means of the illumination, objective 2. Smaller specimens 5 may be examined on account of the higher resolution. Additionally, the bothersome background fluorescence is significantly reduced and the signal-to-noise ratio is improved as a result thereof. In FIGS. 1a and 1b, the light sheet 6 extends along the image plane BE into the plane of the drawing; that is to say, the reader sees an end side of the light sheet 6.

A specimen 5 arranged in a specimen region provided therefor in the specimen plane 4, which is also used as a reference plane, is situated, for example, on the base of a specimen holder 7 that is embodied as a Petri dish. The specimen holder 7 is filled with a medium 8, e.g., water, and the two SPIM objectives 2, 3 are immersed in the medium 8 during the application of the light sheet microscopy (not shown). The specimen plane 4 extends in a plane X-Y spanned by the X-axis X and the Y-axis Y of a Cartesian coordinate system (illustrated in slightly perspective fashion). The first optical axis A1 and the second optical axis A2 extend in a plane Y-Z spanned by the Y-axis Y and the Z-axis Z of the Cartesian coordinate system.

In order to facilitate simpler specimen preparation in standard specimen containers such as e.g. multiwell plates, it is possible to maintain the 45° configuration but have the two SPIM objectives 2, 3, in particular the optical axes A1, A2 thereof, in an inverse arrangement, be directed into the specimen plane 4 from below through the transparent base of the specimen holder 7. FIG. 1b schematically shows a microscope 0 with an inverted arrangement of illumination objective 2 and detection objective 3 according to the prior art, in which the illumination objective 2 and the detection objective 3 are arranged below the specimen plane 4. Once again, the angles α1 and α2 are 45° in each case.

In this arrangement, it is necessary to correct the aberrations caused by the specimen holder 7 which is inclined relative to the optical axes A1 and A2 and present in the form of a cover slip, for example, by using special optical elements. The specimen 5 arranged in the specimen plane 4 is illuminated through the base of the specimen holder 7 and excited fluorescence of the specimen 5 is detected. It is possible to use specimen holders 7 such as e.g. multiwell plates, Petri dishes and/or object supports and contamination of the specimens 5, in particular in the case of high-throughput screening, may be avoided.

DE 10 2013 112 600 A1 has disclosed a virtual relay, which serves to correct errors that arise in the case of an oblique passage of the rays through an object carrier. Since the virtual relay has a high numerical aperture >1.2, pronounced imaging aberrations may occur as a result of small deviations, which may vary from experiment to experiment, within the optical system. These deviations may be based on, inter alia, the variance of the cover slip thickness, changes in temperature, refractive index differences, tilts of the cover slip or wedge errors of the cover slip.

A further possibility for correcting aberrations of a microscope caused by a cover slip is known from the publication by McGorty et al. (2015: Open-top selective plane illumination microscope for conventionally mounted specimens; OPTICS EXPRESS 23: 16142-16153). The inverted SPIM microscope has a water prism, by the effect of which aberrations occurring as a consequence of the oblique passage of the detection light through the cover slip are partly compensated.

SUMMARY OF THE INVENTION

The invention is based on the object of specifying a novel arrangement and a novel microscope, and the use thereof for TIRF microscopy.

This object is achieved by means of an arrangement for TIRF microscopy as claimed in claim 1. In respect of the microscope and the use for TIRF microscopy, the object is achieved by the features of claims 7 and 8, respectively. In respect of the method, the object is achieved by means of the features of claim 9. Advantageous configurations and developments are the subject matter of the dependent claims.

The arrangement, comprises an illumination optical unit with an illumination objective for illuminating a specimen situated on a specimen carrier in a specimen region via an illumination beam path, wherein the optical axis of the illumination objective includes an angle (illumination angle) that differs from zero with the normal of a reference plane, in respect of which the specimen carrier is aligned. Furthermore, a detection optical unit is present, having a detection objective in a detection beam path. The optical axis of the detection objective includes an angle (detection angle) that differs from zero with the normal of the reference plane.

According to the invention, a transition element is present between the specimen carrier and the two objectives, said transmission element being arranged both in the illumination beam path and in the detection beam path. The transition element is embodied to correct aberrations that arise on account of the passage through media with different refractive indices of radiation to be detected, in particular light, and/or radiation for illuminating the specimen. The illumination beam path is directed into the specimen region of the specimen plane at an illumination angle suitable for producing total-internal reflection of the illumination radiation at the specimen plane.

The normal of the reference plane and the optical axes of the illumination objective and of the detection objective advantageously lie in the same plane. In further possible embodiments, the normal of the reference plane and the optical axes of the illumination objective lie in one plane, while the optical axis of the detection objective does not lie in this plane.

The illumination beam path is also suitable for producing total-internal reflection of the illumination radiation at the specimen plane if the illumination radiation propagates in slightly diverging fashion and is subject to total-internal reflection, or if at least components of the illumination radiation are subject to total-internal reflection at the specimen plane.

In the specimen plane, which is also referred to as reference, plane, the specimen is arranged in a region, the specimen region, provided therefor or it can be arranged there.

Should nothing else be expressly described, the TIRF illumination can be implemented in punctiform, line-shaped, ring-shaped, or planar fashion, or over an illumination area with a freely selectable form.

Since the invention advantageously builds on arrangements or microscopes that are currently already available, illumination correction elements or detection correction elements such as Alvarez plates may be present in the illumination beam path and/or in the detection beam path. In order to simplify the description, these illumination correction elements and/or detection correction elements are also referred to as correction element or correction elements below if the description relates to an illumination correction element or to a detection correction element or to both.

During the use of the arrangement and/or the microscope for TIRF microscopy, available correction elements are either removed from the respective beam paths, for example pivoted out or moved out, or optically inactivated, e.g., transferred into a zero position.

In advantageous embodiments of the arrangement, an immersion medium is present between the transition element and the specimen carrier, the optical refractive index of said immersion medium equaling the optical refractive index of the transition element and/or of the specimen carrier. Such an immersion medium leads to a reduction in, or avoidance of, disadvantageous effects of a transition of the illumination radiation and an arising detection radiation through media with different refractive indices. Hence, aberrations occurring on account of the oblique passage of illumination radiation and detection radiation, particularly through the specimen carrier, are avoided or at least significantly reduced. Aberrations occurring during the transition of illumination radiation and/or detection radiation between a side face of the specimen carrier facing the specimen and the specimen are insignificant since an image of the specimen is recorded near the transition of specimen carrier and specimen on account of the low penetration depth of an evanescent field of a TIRF illumination.

By way of example, the transition element and the specimen carrier may consist of glass. The immersion medium has a refractive index that corresponds to the refractive index of glass, particularly under conventional use conditions of the arrangement, for example at temperatures between 15 and 35° C. Here, deviations between the refractive indices of no more than 0.1, preferably of no more than 0.05, are considered to be equal to one another.

The immersion medium with an optical refractive index equaling the refractive index of the transition element and/or specimen carrier is, e.g., an oil, an oil mixture, an oil-containing mixture or a suitable liquid with the appropriate optical properties and sufficient transparency to the illumination radiation and the detection radiation.

In one possible embodiment, the transition element is a meniscus lens, wherein an immersion medium as described above is present between said meniscus lens and the specimen carrier.

A meniscus lens is a lens which has two lens faces that are curved to the same side. Advantageously, both lens surfaces have the same center point. The two lens surfaces of the meniscus lens can be situated in different media, for example immersion media and/or air, with a different refractive index in each case. In relation to a virtual relay, the meniscus lens is advantageous in that it is able to be produced more easily and more cost effectively.

In further embodiments, the transition element is embodied as a virtual relay or as an immersion chamber. In order to use the arrangement for TIRF microscopy, the immersion chamber is filled with the immersion medium.

A virtual relay is understood to mean a lens that produces a magnified virtual image of the specimen on the specimen side. This image is imaged on a camera using a microscope objective. Additionally, one or both sides of the virtual relay have an aspherical form, as a result of which aberrations of the oblique cover slip passage can be compensated.

The virtual relay is embodied in such a way that a correction of aberrations occurring on account of the oblique passage of illumination radiation and/or detection radiation is implemented by an appropriate design of the inner side of the virtual relay. The inner side is the face or side face of the virtual relay facing the specimen carrier.

The objectives can be embodied as dry objectives for the purposes of using the arrangement with a meniscus lens or with a virtual relay as a transition element.

The objectives are embodied as immersion objectives if the immersion chamber is used as, a transition element.

The arrangement can have a separation layer system with at least one layer made out of a predetermined material with a predetermined thickness. The at least one layer, for example a cover slip, separates a medium, in which the specimen is situated, from the illumination objective and the detection objective, or from the meniscus lens or from the virtual relay. By means of a base that is aligned parallel to the reference plane, the separation layer system is in contact with the medium and/or with an immersion medium, at least in the region that is accessible to the illumination objective and the detection objective for the purposes, of illumination and detection, respectively. The medium and the immersion medium are separated from one another by way of the separation layer system.

In order to realize an arrangement for TIRF light sheet microscopy, a radiation used for illumination purposes (illumination radiation) is formed into a light sheet and directed into the specimen region. In alternative embodiments, the light sheet is produced in the specimen region by means of the illumination radiation by virtue of, for example, a beam of the illumination radiation being moved in the plane (dynamic light sheet).

In an advantageous embodiment, the optical, axis of the illumination objective and the light sheet lie in a plane which includes an illumination angle that differs from zero with the normal of the reference plane. A normal of the light sheet, which extends in a plane (image plane), preferably extends in a plane spanned by the optical axis of the illumination objective and the normal of the reference plane. Advantageously, the optical axis of the detection objective likewise extends in this plane. This embodiment admits a flat structure. Therefore, the plane of the light sheet penetrates the reference plane and the normal of the light sheet intersects the reference plane.

In a further possible embodiment, the normal of the reference plane lies in the same plane as the optical axis of the illumination objective and the light sheet or the image plane. The normal of the light sheet extends orthogonal to that plane in which the optical axis of the illumination objective, the normal of the reference plane and the light sheet or the image plane lie. The optical axis of the detection objective is directed on the plane in order to capture image data from the image plane.

The arrangement according to the invention is usable, in particular, in an inverted light sheet microscope with an oblique passage of the illumination and detection radiation through a specimen holder, for example in the form of a cover slip or an optically transparent layer such as the base of a Petri dish. The arrangement is advantageously usable for imaging regions of the specimen by means of TIRF microscopy, for example TIRF light sheet microscopy. Here, the arrangement can be part of the microscope.

In order to carry out the TIRF microscopy, illumination radiation for illuminating a specimen situated on a specimen carrier in a specimen region of a specimen plane is directed to the specimen via an illumination beam path. Here, the optical axis of the illumination objective includes an illumination angle that differs from zero with the normal of the specimen plane, in respect of which the specimen carrier is aligned. Detection radiation is captured along a detection beam path, the optical axis of which includes a detection angle that differs from zero with the normal of the specimen plane. The illumination radiation and the detection radiation are radiated-in via or captured by a transition element arranged both in the illumination beam path and in the detection beam path, wherein the transition element is embodied to correct aberrations that arise on account of the passage through media with different refractive indices of radiation to be detected and/or of radiation for illuminating the specimen. The illumination beam path is directed into the specimen region of the specimen plane at an illumination angle suitable for producing total-internal reflection of the illumination radiation at the specimen plane. The illumination angle can be selected on account of a calculation or by way of successively setting different illumination angles and the effects obtained with the respective illumination angles. During, a calculation, the optical data of employed objectives, of the transition element and of available or selectable immersion media and of the specimen carrier and, where applicable, of the specimen are advantageously taken into account and, for example, incorporated into the calculation.

BRIEF DESCRIPTION OF THE DRAWINGS

The invention is explained in more detail below on the basis of exemplary embodiments and figures. In the figures.

DETAILED DESCRIPTION OF EMBODIMENTS OF THE INVENTION

The exemplary embodiments are illustrated schematically. Identical technical elements are provided with the same reference signs.

FIGS. 1a and 1b were already explained in more detail in the introductory part of the description.

The following exemplary embodiments are illustrated in an exemplary manner on the basis of inverted microscopes 0 and, in further embodiments, may also be embodied as upright microscopes 0.

A shared transition element 10 (FIG. 2) is present as an essential element of an arrangement according to the invention for microscopy, in particular for light sheet microscopy, in addition to the illumination objective 2 that is aligned obliquely in relation to the specimen or reference plane 4 and the detection objective 3 that is likewise aligned obliquely in relation to the reference plane 4.

Figure 2:
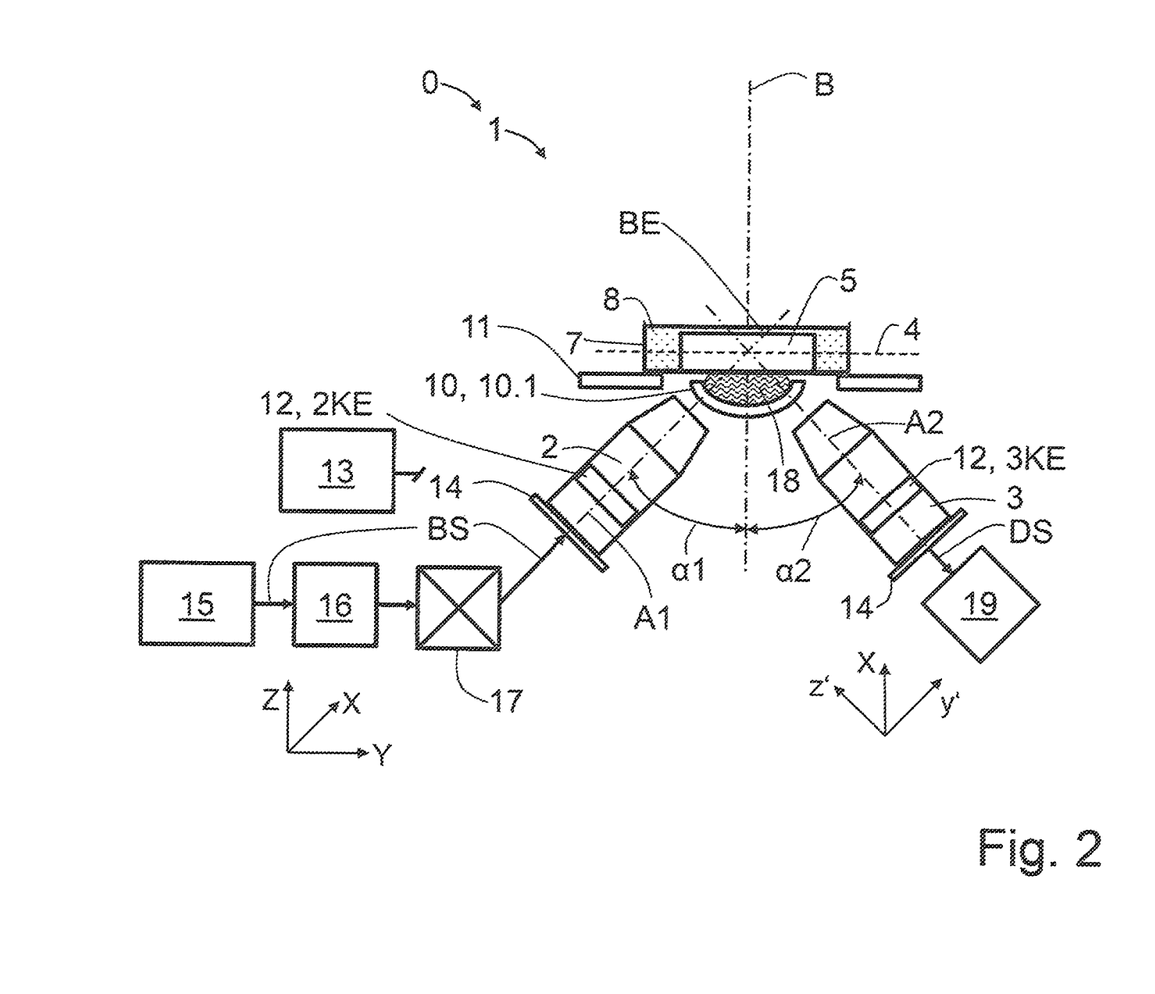
FIG. 2 is a schematic illustration of a first exemplary embodiment of an arrangement of a TIRF light sheet microscope according to the invention.

An exemplary embodiment of an arrangement 1 of an inverted microscope 0 embodied for TIRF light sheet microscopy (only indicated) with correction elements 2KE, 3KE and a transition element 10 in the form of a meniscus lens 10.1 is illustrated in FIG. 2. The angles $\alpha 1$ and $\alpha 2$ between a normal B that is perpendicular to the reference plane 4 and the first optical axis A1 and the second optical axis A2, respectively, are 60° and 30° (see FIG. 4). In each case, two Alvarez plates of an Alvarez manipulator 12 are arranged in the beam path of the illumination radiation BS and in the beam path of the detection radiation DS as adaptive correction elements 2KE, 3KE. The correction elements 2KE, 3KE are removed from the respective beam paths when using the arrangement 1 for TIRF light sheet microscopy. The meniscus lens 10.1 assists the transition of the illumination radiation BS from air into an immersion medium 18 and into the medium 8 and the transition of the detection radiation DS from the medium 8 into the immersion medium 18 and into the air. The immersion medium 18 has an optical refractive index that equals the optical refractive indices of the meniscus lens 10.1 and of the specimen carrier 7.

The specimen holder 7 is held on the specimen stage 11. The specimen stage 11 itself is adjustable in a controlled fashion in an XY-plane, spanned by the X-axis X and the Y-axis Y, by means of drives that are not illustrated in any more detail.

The illumination objective 2 and the detection objective 3 are each adjustable in a controlled fashion along the first optical axis A1 and along the second optical axis A2, respectively, by means of an objective drive 14, which is embodied as a piezo-drive in this case.

The illumination radiation BS is provided by a laser module 15 and shaped by means of a beam-shaping unit 16. The beam-shaping unit 16 is, e.g., an optical unit, by means of which the provided illumination radiation BS is formed, e.g., collimated.

A scanner 17 is present downstream of the beam-shaping unit 16, the shaped illumination radiation BS being deflectable in a controlled fashion in two directions by means of said scanner.

Downstream of the scanner 17, the illumination objective 2 is arranged on the first optical axis A1. The illumination radiation BS that is deflected by the scanner 17 reaches the illumination objective 2 and it is shaped and/or focused by the latter. The light sheet 6 is produced in a specimen region, in which the specimen 5 is situated, by an appropriate deflection of the illumination radiation BS by means of the scanner 17.

The detection radiation DS coming from the specimen 5 and from the specimen region is directed onto a detector 19 along the second optical axis A2 and able to be captured by said detector.

A control unit 13 is present for the purposes of actuating the specimen stage 11, the objective drives 14, the correction elements 2KE, 3KE, the laser module 15, the beam shaping 16, the scanner 17 and/or the detector 19, said control unit being linked to the elements to be actuated in a connection suitable for data transmission (only indicated).

In further embodiments, the control unit 13 is additionally configured to capture, store and/or evaluate measurement values. Further elements and units of the microscope 0 may be actuatable by means of the control unit 13 and/or measurement values can be obtained and evaluated thereby.

For description purposes, two coordinate systems with mutually orthogonal axes are used below. The first coordinate system is the coordinate system of the entire arrangement with an X-axis X, a Y-axis Y and a Z-axis Z. Ideally, the specimen holder 7, in particular the base thereof, is aligned parallel to an XY-plane that is spanned by the X-axis X and the Y-axis Y. The second coordinate system is the coordinate system of the detector 19 with the X-axis X, a y-axis y' and a z-axis z'. Imaging of, for example, an image from the image plane BE onto the detector 19 has the coordinates X and y'. The X-axis X is directed in orthogonal fashion to the plane of the drawing of the figures in both coordinate systems. The two other axes Y and y' and Z and z', respectively, can be superposed on one another by way of a rotation about the X-axis X.

The base of the specimen holder 7 represents a separation layer system with at least one layer made of a predetermined material with a predetermined thickness, separating a medium 8, in which the specimen 5 is situated, from the illumination objective 2, the detection objective 3 and from the meniscus lens 10.1. By means of a base that is aligned parallel to the specimen plane 4, the separation layer system is in contact with the immersion medium 18, at least in the region accessible to the illumination objective 2 and to the detection objective 3 for illumination and detection purposes, respectively.

In the further possible embodiments of the microscope 0 and/or of the arrangement 1 with illumination correction element 2KE and/or detection correction element 3KE, these are set in such a way that no optical corrective effect is caused thereby.

Figure 3:
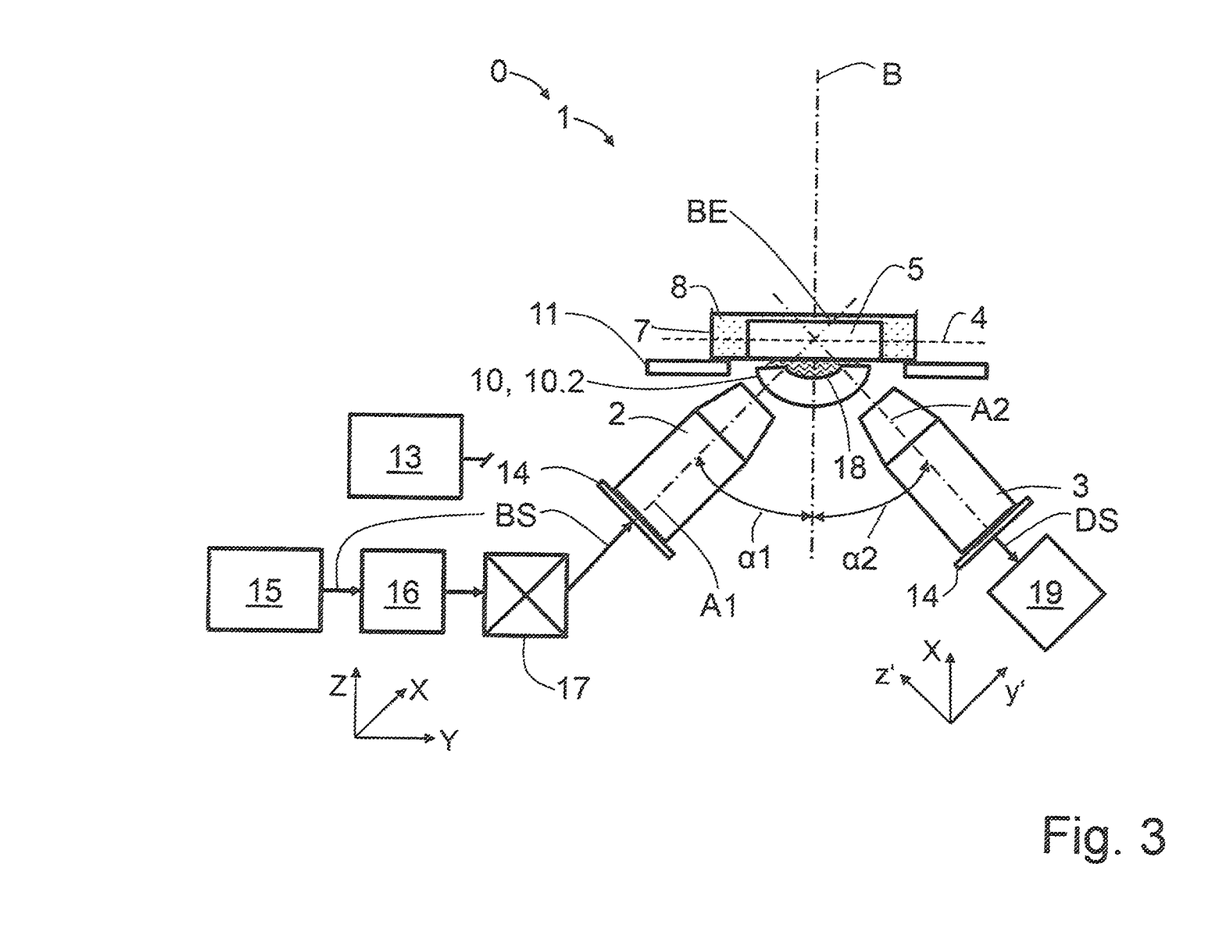
FIG. 3 is a schematic illustration of a second exemplary embodiment of an arrangement of a TIRF light sheet microscope according to the invention.

No illumination correction elements 2KE and no detection correction element 3KE are present in a second exemplary embodiment of the arrangement 1 (FIG. 3).

The transition element is embodied as a virtual relay 10.2. The latter is configured in such a way that a correction of aberrations occurring on account of the oblique passage of illumination radiation BS and/or detection radiation DS is implemented by an appropriate design of the inner side of the virtual relay 10.2. The inner side is the face or side face of the virtual relay 10.2 facing the specimen carrier 7.

Figure 4:
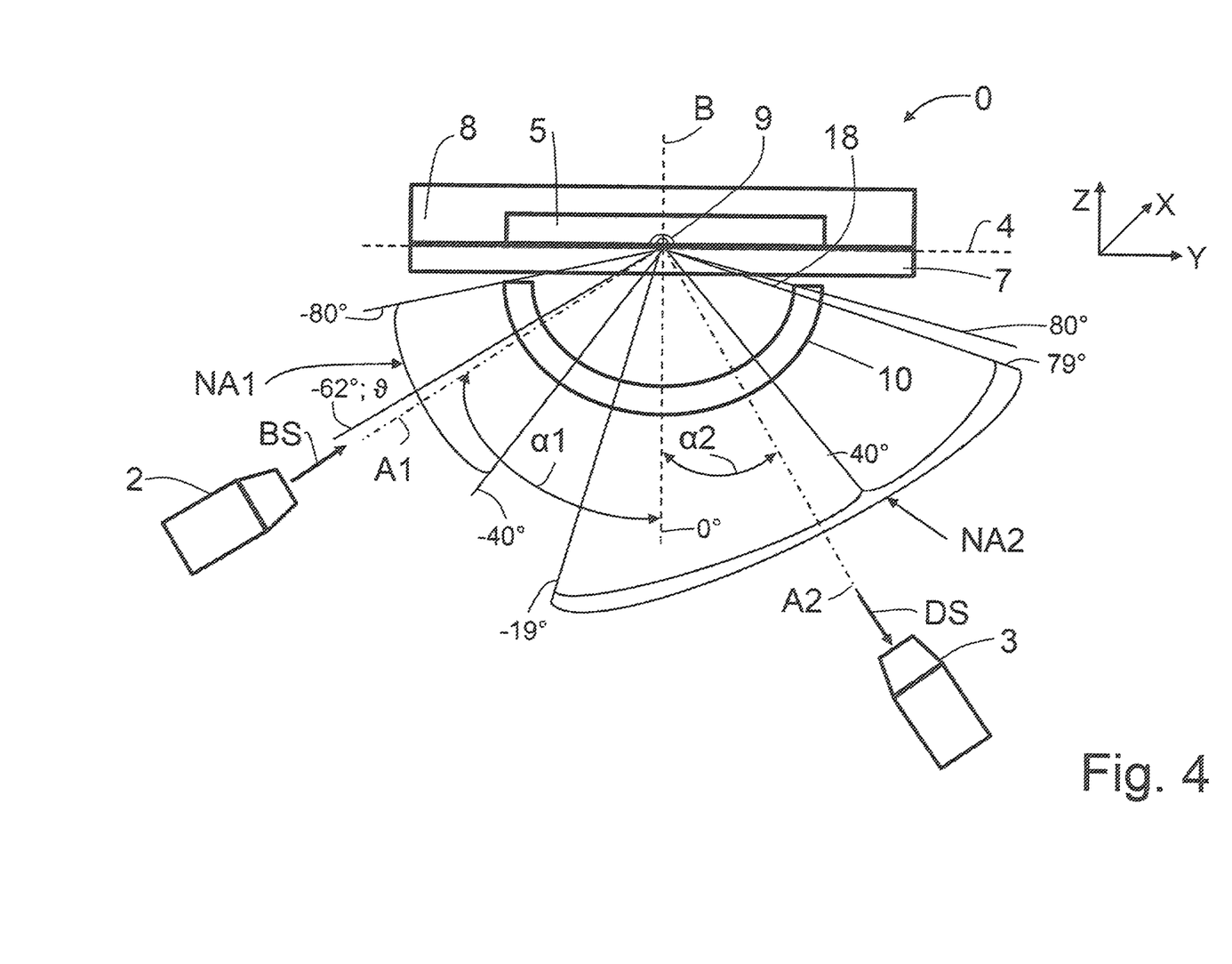
FIG. 4 is a schematic illustration of the aperture angles of an illumination objective with a numerical aperture of 0.4 and of a detection objective with a numerical aperture of 1.0, of an arrangement according to the invention of a TIRF light sheet microscope.

In order to visualize the illumination conditions, FIG. 4 illustrates, for an arrangement 1 according to the invention for a microscope 0, the aperture angle of an illumination objective 2 with a first numerical aperture NA1 of 0.4 and of a detection objective 3 with a second numerical aperture NA2 of 1.0.

Here, illumination radiation BS emitted by the illumination objective 2 covers an angle range from −40° to −80°. The first optical axis A1 of the illumination objective 2 is directed to the specimen plane 4 at an illumination angle α1 of −60°.

The numerical aperture NA2 of the detection objective 3 is 1.0. The optical axis A2 of the latter extends at an angle α2 of 30°. The detection radiation DS covers an angle range from −19° to −79°.

Under the exemplary assumption that the specimen 5 has a refractive index of $n_1=1.33$ and, the immersion medium 18 has a refractive index of $n_2=1.50$, the following, is obtained for the angle ϑ of total-internal reflection.

$$\vartheta=\sin^{-1}(n_1/n_2)=62°$$

Therefore, an angle range from −62° to −80° is available for TIRF illumination by means of the illumination objective 2. The negative signs arise from the angle designations chosen in FIG. 4, proceeding from the normal B, shown as perpendicular, at 0°.

An illumination beam directed at an illumination angle α1 of −62° to the side face of the specimen holder 7 that acts as an interface and that faces the specimen 5 is subject to total-internal reflection at, the interface, with an evanescent field 9 (illustrated schematically and in exaggerated fashion) propagating into the specimen 5. If detectable radiation, for example fluorescence radiation, is excited in the specimen 5 by the evanescent field 9, said radiation can be captured as detection radiation DS.

Figure 5:
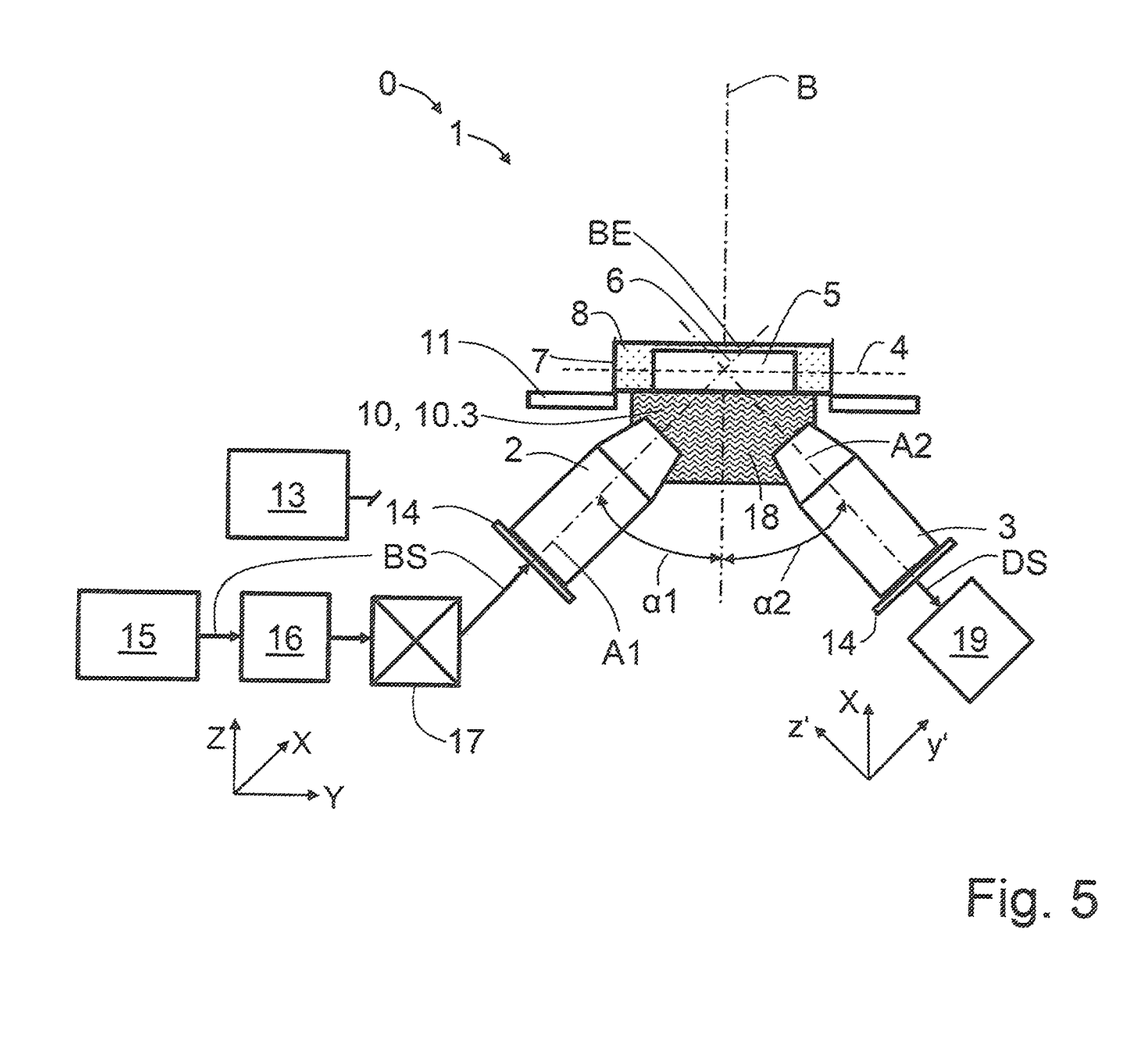
FIG. 5 is a schematic illustration of a third exemplary embodiment of an arrangement of a TIRF light sheet microscope according to the invention.

In a third embodiment of the arrangement 1 according to the invention, the transition element 10 is embodied in the form of an immersion chamber 10.3 (FIG. 5), The objectives 2, 3 are embodied as immersion objectives. The transition element 10 in the proper meaning of the phrase is formed by an upper wall of the immersion chamber 10.3. In order to develop the corrective effect, the immersion chamber 10.3 is filled with an immersion medium 18, the refractive index of which, as described above, equals the refractive index of the specimen carrier 7 and of the objectives 2, 3.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

0 Microscope
1 Arrangement
2 Illumination objective
2KE Illumination correction element
3 Detection objective
3KE Detection correction element
4 Specimen plane reference plane)
5 Specimen
6 Light sheet
7 Specimen holder
8 Medium
9 Evanescent field
10 Transition element
10.1 Meniscus lens
10.2 Virtual relay
10.3 Immersion chamber
11 Specimen stage
12 Alvarez manipulator
13 Control unit
14 Objective drive
15 Laser module
16 Beam shaping
17 XY-scanner
18 Immersion medium
19 Detector
A1 First optical axis (optical axis of the illumination objective 2)
A2 Second optical axis (optical axis of the detection objective 3)
α1 Angle/illumination angle.
α2 Angle/detection angle
ϑ Angle of total-internal reflection
B Normal
BE Image plane
BS Illumination radiation
DS Detection radiation
NA1 First numerical aperture
NA2 Second numerical aperture

What is claimed is:

1. An arrangement for total-internal reflection fluorescence microscopy (TIRF microscopy), comprising
an illumination optical unit with an illumination objective for illuminating a specimen situated on a specimen carrier in a specimen region of a specimen plane via an illumination beam path, wherein
an optical axis of the illumination objective includes an illumination angle that differs from zero with the normal of the specimen plane, in respect of which the specimen carrier is aligned,
a detection optical unit with, a detection objective in a detection beam path having an optical axis which includes a detection angle that differs from zero with the normal of the specimen plane,
a transition element located between the specimen carrier and the illumination and detection objectives, said transition element being arranged both in the illumination beam path and in the detection beam path;
the transition element is configured to correct aberrations that arise on account of the passage through media with different refractive indices of radiation to be detected and/or radiation for illuminating the specimen, and
wherein the illumination beam path is directed into the specimen region of the specimen plane at an illumination angle suitable for producing total-internal reflection of the illumination radiation at the specimen plane.

2. The arrangement, as claimed in claim 1, further comprising an immersion medium between the transition element and the specimen carrier, the refractive index of said immersion medium equaling the refractive index of the transition element and/or of the specimen carrier.

3. The arrangement as claimed in claim 2, wherein the transition element is a meniscus lens.

4. The arrangement as claimed in claim 1, wherein the transition element is a virtual relay or an immersion chamber.

5. The arrangement as claimed in claim 1, wherein radiation used for illumination purposes is formed into a light sheet and directed into the specimen region.

6. The arrangement as claimed in claim 5, wherein the optical axis of the illumination objective and the light sheet lie in a plane that includes an illumination angle that differs from zero with the normal of the specimen plane.

7. A microscope comprising an arrangement as claimed in claim 1.

8. The use of an arrangement as claimed in claim 1 for imaging regions of said specimen by means of TIRF microscopy.

9. A method for TIRF microscopy, comprising
directing illumination radiation for illuminating a specimen situated on a specimen carrier in a specimen region of a specimen plane to the specimen via an illumination beam path having an illumination objective, wherein an optical axis of the illumination objective includes an illumination angle that differs from zero with the normal of the specimen plane, in respect of which the specimen carrier is aligned,
capturing detection radiation along a detection beam path having an optical axis which includes a detection angle that differs from zero with the normal of the specimen plane,
radiating-in the illumination radiation and the detection radiation through or captured through a transition element arranged both in the illumination beam path and in the detection beam path, wherein the transition element is configured to correct aberrations that arise on account of the passage through media with different refractive indices of radiation to be detected and/or of radiation for illuminating the sample, and
directing the illumination beam path into the specimen region of the specimen plane at an illumination angle suitable for producing total-internal reflection of the illumination radiation at the specimen plane.

* * * * *

UNITED STATES PATENT AND TRADEMARK OFFICE
CERTIFICATE OF CORRECTION

PATENT NO. : 11,231,572 B2
APPLICATION NO. : 16/482827
DATED : January 25, 2022
INVENTOR(S) : Jörg Siebenmorgen and Ralf Netz It is certified that error appears in the above-identified patent and that said Letters Patent is hereby corrected as shown below:

In the Specification

Column 1, Line 26  now reads: "TIRF microscopy (total-Internal reflection fluorescence"
should read: --TIRF microscopy (total-internal reflection fluorescence--

Column 1, Line 55  now reads: "specimen plane 4 from above at an angle α1 or α2 of 45' in"
should read: --specimen plane 4 from above at an angle α1 or α2 of 45° in--

Column 1, Line 59  now reads: "a thin light sheet 6 (see also FIG. 1b) may be, produced in"
should read: --a thin light sheet 6 (see also FIG. 1b) may be produced in--

Column 1, Line 60  now reads: "an image plane BE by means of the illumination, objective"
should read: --an image plane BE by means of the illumination objective--

Column 3, Line 3  now reads: "The arrangement, comprises an illumination optical unit"
should read: --The arrangement comprises an illumination optical unit--

Column 3, Line 41  now reads: "reference, plane, the specimen is arranged in a region, the"
should read: --reference plane, the specimen is arranged in a region, the--

Column 4, Line 61  now reads: "the immersion chamber is used as, a transition element."
should read: --the immersion chamber is used as a transition element.--

Column 5, Line 5  now reads: "and the detection objective for the purposes, of illumination"
should read: --and the detection objective for the purposes of illumination--

Column 5, Line 17  now reads: "In an advantageous embodiment, the optical, axis of the"
should read: --In an advantageous embodiment, the optical axis of the--

Signed and Sealed this
Twenty-third Day of August, 2022

Katherine Kelly Vidal
*Director of the United States Patent and Trademark Office*

CERTIFICATE OF CORRECTION (continued)

U.S. Pat. No. 11,231,572 B2

| | |
|---|---|
| Column 6, Line 4 | now reads: "During, a calculation, the optical data of employed objec-"<br>should read: --During a calculation, the optical data of employed objec- -- |
| Column 8, Line 52 | now reads: "total-internal reflection at, the interface, with an evanescent"<br>should read: --total-internal reflection at the interface, with an evanescent-- |
| Column 9, Line 21 | now reads: "4 Specimen plane reference plane)"<br>should read: --4 Specimen plane (= reference plane)-- |